(12) United States Patent
Shtilman et al.

(10) Patent No.: US 7,873,952 B2
(45) Date of Patent: Jan. 18, 2011

(54) CODE TRANSFORMATION TO OPTIMIZE FRAGMENTS THAT IMPLEMENT CONSTANT LOADING

(75) Inventors: Dmitri Shtilman, Foster City, CA (US); Maksim V. Panchenko, Union City, CA (US); Fu-Hwa Wang, Saratoga, CA (US)

(73) Assignee: Oracle America, Inc., Redwood City, CA (US)

(*) Notice: Subject to any disclaimer, the term of this patent is extended or adjusted under 35 U.S.C. 154(b) by 1141 days.

(21) Appl. No.: 11/371,870

(22) Filed: Mar. 9, 2006

(65) Prior Publication Data
US 2007/0226717 A1  Sep. 27, 2007

(51) Int. Cl.
G06F 9/45 (2006.01)
(52) U.S. Cl. .................................................. 717/154
(58) Field of Classification Search .......... 717/136–167
See application file for complete search history.

(56) References Cited

U.S. PATENT DOCUMENTS

| | | | | |
|---|---|---|---|---|
| 4,656,583 A * | 4/1987 | Auslander et al. | ........... | 717/153 |
| 5,724,590 A * | 3/1998 | Goettelmann et al. | ....... | 717/154 |
| 5,836,014 A * | 11/1998 | Faiman, Jr. | ................. | 717/156 |
| 6,091,896 A * | 7/2000 | Curreri et al. | ............... | 717/125 |
| 6,260,190 B1 * | 7/2001 | Ju | .............................. | 717/156 |
| 6,286,135 B1 * | 9/2001 | Santhanam | ................. | 717/146 |
| 6,463,582 B1 * | 10/2002 | Lethin et al. | ................ | 717/158 |
| 6,665,671 B2 * | 12/2003 | Coutant | ......................... | 707/8 |
| 6,925,636 B2 * | 8/2005 | Haugen et al. | .............. | 717/146 |
| 7,010,785 B2 * | 3/2006 | Haber et al. | ................ | 717/151 |
| 7,240,341 B2 * | 7/2007 | Plummer et al. | ............ | 717/148 |
| 7,426,724 B2 * | 9/2008 | Kilgard et al. | .............. | 717/151 |
| 2001/0047513 A1 * | 11/2001 | Tock | ............................ | 717/10 |
| 2002/0147969 A1 * | 10/2002 | Lethin et al. | ................ | 717/138 |
| 2004/0205740 A1 * | 10/2004 | Lavery et al. | ............... | 717/151 |

(Continued)

OTHER PUBLICATIONS

Strategies for Source-toSource Constant Propagation by Karina Olmos, and Eelco Visser. Technical Report Institute of Information and Computing Sciences, Utrecht University. Oct. 2002.*

(Continued)

*Primary Examiner*—Anna Deng
(74) *Attorney, Agent, or Firm*—Gregory P. Durbin; Polsinelli Shughart PC

(57) ABSTRACT

A code, which may be a post-link binary or a pre-link object file, can be transformed to optimize code fragments that implement loading a constant from memory. A constant loading code fragment includes address computing operations that compute (or copy) an address representation of a constant for consumption by a memory access operation, and the memory access operation that loads the constant. Information from control flow analysis, data flow analysis, and binary structure/configuration analysis are examined to identify code fragments of a code that implement constant loading. A tool transforms the code to convert the identified code fragments. To optimize, the tool may convert operations, eliminate operations, convert indirect calls to direct calls, inline functions called indirectly, eliminate unused constant data, modify relocations, etc. This optimization can also be applied recursively. The same tool or another tool can subsequently analyze the transformed code one more times to identify additional opportunities for optimizations revealed by the transformation or to apply the transformation for a different profile of the application.

11 Claims, 12 Drawing Sheets

U.S. PATENT DOCUMENTS

| | | | | |
|---|---|---|---|---|
| 2004/0221277 | A1* | 11/2004 | Owen et al. | 717/138 |
| 2005/0050533 | A1* | 3/2005 | Koseki et al. | 717/158 |
| 2006/0048118 | A1* | 3/2006 | Archambault et al. | 717/151 |
| 2006/0059477 | A1* | 3/2006 | Harscoet | 717/166 |
| 2006/0212862 | A1* | 9/2006 | Nesbitt et al. | 717/151 |
| 2007/0169039 | A1* | 7/2007 | Lin | 717/146 |
| 2008/0052688 | A1* | 2/2008 | O'Brien et al. | 717/140 |

OTHER PUBLICATIONS

"Link-Time Binary Rewriting Techniques for Program Compaction", Bjorn De Sutter, Bruno De Buss, and Koen De Bosschere. Ghent University. ACM Transaction on Programming Languages and Systems, vol. 27, No. 5, Sep. 2005, p. 882-945.*

"Towards Better Inlining Decisions Using Inling Trails", Jeffrey Dean and Craig Chambers, Department of Computer Science and Engineering, University of Washington. 1994.*

"Software Power Optimization via Post-Link-Time Binary Rewriting", Saumya Debray, Rober Muth, and Scott Watterson. Department of Computer Science, Univeristy of Arizona, Tuscson, AZ. 2001.*

Li, S., "A Survey on Tools for Binary Code Analysis," Stony Brook University, 39 pages, Aug. 24, 2004.

Nethercote, N., "Dynamic Binary Analysis and Instrumentation," University of Cambridge Computer Laboratory, Technical Report No. 606, United Kingdom, 177 pages, Nov. 2004.

Harris, Laune C. & Miller, Barton P., "Practical Analysis of Stripped Binary Code," ACM SIGARCH Computer Architecture News, vol. 33, No. 5, pp. 63-68, Dec. 2005.

* cited by examiner

CODE TRANSFORMATION TO OPTIMIZE FRAGMENTS THAT IMPLEMENT CONSTANT LOADING

BACKGROUND

1. Field of the Invention

The invention relates generally to code optimization, and, more specifically, relates to optimization of code that implements constant loading.

2. Description of the Related Art

As the speed of processors continues to grow at a much higher rate than that of memory systems, it is becoming increasingly important to optimize applications for memory related operations.

Contemporary compilers use a wide range of optimization techniques to maximize the use of machine registers and avoid costly memory references whenever possible. Particularly, compilers try to improve the efficiency of the generated code with respect to usage of constants, leveraging mechanisms provided by many programming languages to create data objects with constant values. Compilers can use this knowledge to propagate constants in the code and to avoid unnecessary memory references. However, the optimization scope is often limited to just one module at a time. A compiler, not having the complete view of a program, is often forced to generate inefficient code. For example, when a module is accessing an externally defined constant, the compiler has to generate code that will calculate the address of the constant and load its value. The reason for loading the constant at run-time and not using its value directly is that this value is simply not visible at compile time. Even if compilers had access to other modules, many constants, such as addresses, would not be available because their values would not be finalized until after the link phase.

These limitations may result in many redundant address calculations and memory references, both weighing on memory hierarchy, adversely affecting the performance of the application. Address calculation and load instructions will increase pressure on the instruction cache, and access to data will disrupt the data cache. Consequently, address calculation and load instructions may cause misses on higher cache levels, misses in iTLB and dTLB, page faults, accesses to disk, etc., thus slowing the application.

Often, despite severe performance drawbacks, application developers choose to use externally-defined constants because of quite useful side effects. For example, the usual technique for incorporating changes into a large application is rebuilding only the modules that are affected by the changes and then relinking these rebuilt modules with the untouched modules to get an updated version of the large application. If the scope of the changes is global (e.g., change of global structures) incorporation of changes to the large application may require complete recompilation. If structure changes frequently, this technique for incorporating changes into a large application may prove to be slow and inefficient. This inefficiency propagates to the development process and significantly slows the development process as well. In these situations, developers often may choose to prepare the application for handling certain data structures at runtime. For example, an offset table that would hold an offset for each field in this structure may be defined for each global structure. Throughout the application, each time a code needs to access a field in a structure of this type, it would have to first load the field's offset from the table at run time. This approach allows the old code to handle the updated structures while avoiding recompilation. Hence, if some structure is changed, a developer updates the offset table for that structure, perhaps recompiles a few affected files, and re-links. The flexibility of this approach, however, comes at a high cost to performance. Each field access incurs a redundant load (offset) with associated redundant instructions.

SUMMARY

It has been discovered that information from program analysis can be leveraged to optimize code fragments that implement loading of constants. Information from the analysis is employed to identify an instruction instance that loads a constant, and corresponding instruction instances that calculate the constant's address representation. Constant load optimization may involve elimination of address computing operations, conversion of one or more load operations into faster operations that relieve pressure on the memory hierarchy of a system, removal or conversion of operations that consume the identified constants, both removal and conversion of operations, changing a value of an operation, etc. Control flow analysis and data flow analysis are utilized to identify memory access operations (e.g., load instruction instances), and, if applicable, corresponding operations that compute address representations for the read type memory access operations. Binary structure/configuration analysis determines read-only areas of an address space for the binary (i.e., areas of the address space that host constant data). A software tool uses the analysis information to convert the read type memory access operations that set constants into more efficient operations (e.g., register operations), and to remove all or part of the corresponding address representation computing operations made redundant by the conversion. Optimization of code fragments that implement constant loading also exposes other opportunities for optimization of the binary.

BRIEF DESCRIPTION OF THE DRAWINGS

The present invention may be better understood, and its numerous objects, features, and advantages made apparent to those skilled in the art by referencing the accompanying drawings.

FIG. 4A depicts an example flowchart for optimization of code fragments that implement constant loading. FIG. 4B depicts an example portion of the flowchart in FIG. 4A to reflect cost/benefit analysis.

FIG. 5A depicts an example flowchart for optimizing redundant code that implements loading a relocation constant. FIG. 5B depicts an example portion of the flowchart in FIG. 5A to reflect cost/benefit analysis. FIG. 5C depicts a flowchart that continues from FIG. 5B.

FIG. 7A depicts an example flowchart for recursively optimizing code fragments that implement constant loading. FIG. 7B depicts an example flowchart that continues from FIG. 7A.

The use of the same reference symbols in different drawings indicates similar or identical items.

DESCRIPTION OF THE EMBODIMENT(S)

The description that follows includes exemplary systems, methods, techniques, instruction sequences and computer program products that embody techniques of the present invention. However, it is understood that the described invention may be practiced without these specific details. For instance, although depicted examples use instructions instances from a SPARC®, which is a registered trademark of SPARC International, Inc., architecture instruction set, the invention is not limited to any particular instruction set. In other instances, well-known instruction instances, protocols, structures and techniques have not been shown in detail in order not to obscure the invention.

The following description refers to a fragment of code that implements loading a constant or constant loading code fragment, and constant. A fragment of code that implements loading a constant is one or more coherent operations that implement loading a constant from memory. Implementing loading of a constant at least comprises computing an address representation (i.e., indication of a target memory location) and reading a constant at a location indicated by the computed address representation. When a constant load is executed, a system's implementation of the memory hierarchy will propagate the constant from main memory (or disk) into lower latency memory (e.g., disk→system memory→caches→registers, with registers being the lowest latency memory). It should be appreciated that a memory hierarchy may be implemented differently across different systems and architectures. An address representation (e.g., physical address, virtual address, etc.) for the target memory location may be computed by one or more operations (address computing operations) to implement loading a constant (i.e., produce an address representation for consumption by the one or more operations that load the constant). A constant is a data object that resides in an area of address space with limited writing permission. A constant may be a value constant or a relocation constant. A value constant remains unchanged through the linking process. The loading of these value constants can be optimized in both pre-link object files and (post-link) binaries. A relocation constant is updated by a linker. In binaries, a relocation constant can be treated as a simple value constant. In pre-link object files, an optimization should account for the relocation attached to a relocation constant's location. For example, to store an absolute address in an application's constant data area, a place for the absolute address is allocated; furthermore, a relocation is generated and attached to that place which will cause the linker to fill in the proper address. Loads of a relocation constant may be optimized in the pre-link object through the analysis of the relocation.

Figure 1:
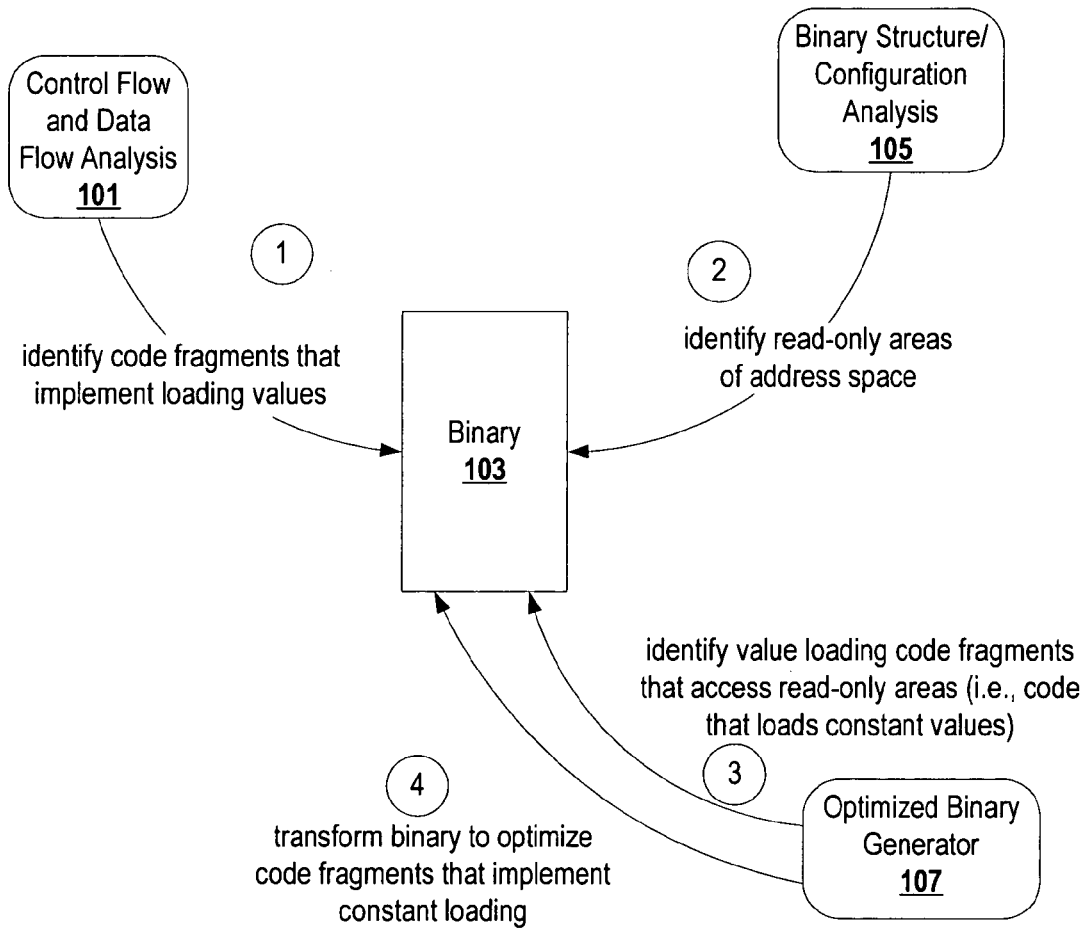
FIG. 1 depicts an example binary transformation for optimization of code fragments that implement constant loading.

FIG. 1 depicts an example binary transformation for optimization of code fragments that implement constant loading. Control flow and data flow analysis tool 101 analyzes a binary 103 to identify code fragments that implement loading values (e.g., read type memory access operations and corresponding address computing operations). A binary structure/configuration analysis tool 105 analyzes the binary 103 to identify read-only areas of address space. A optimized binary generator 107 identifies value loading code fragments that access read-only areas (i.e., code fragments that perform address computing and constant loading) with analysis information from the binary structure/configuration analysis tool 105 and the control flow and data flow analysis tool 101. The optimized binary generator 107 then transforms the binary 103 to optimize the operations of the code fragments that implement constant loading. The optimized binary generator 107 may generate a new binary based on the analysis information with the optimization for the operations of the constant loading code fragments. Although FIG. 1 depicts the control flow and data flow analysis tool 101 separate from the binary structure/configuration analysis tool 105, a single tool or suite of tools may provide the functionality of both. A binary analysis tool may disassemble the binary 103 for control flow and data flow analysis and aggregate the information from the binary structure/configuration analysis that identifies read-only areas of the address space. The responsibility for identifying code fragments that implement constant loading with the analysis information may be implemented in a separate tool, a binary analysis tool, etc.

Once the code fragments that implement constant loading are identified through control flow, data flow and binary structure analysis, an optimized binary generator can optimize these fragments in different ways. For example, a fragment can be optimized coincident with identification, and the memory access loading operations may be converted to more efficient operations. In addition, the operations rendered redundant by the conversion may be deleted immediately or marked for future deletion. The tool can employ different techniques and strategies to decide whether it would be beneficial to optimize each identified fragment. For example, each fragment may be supplemented or annotated with execution frequency information for each operation instance in this fragment (profile count). One strategy is to compare the profile counts of the operations that will be deleted as redundant by optimization to the profile count of operations that would need to be added during optimization. The comparison might involve assigning weights to operations (e.g., a load operation would have a higher weight compared to register operations to reflect the fact that a few register operations may be faster than one load operation). The optimized fragments along with parts of the input binary could then be brought together to form an optimized binary.

The transformation of a binary to optimize code fragments that implement constant loading may involve conversion of operations, removal of operations, conversion of a value of an operation, removal and conversion of operations, etc. For example, address computing operations may produce an address representation only consumed by read type memory operations identified by the tool to be constant loads. If all of the identified constant loads are optimized by the tool, there is no more use for the address representation since there is no need to load data from memory. The address computing operations are made redundant and can be removed. Sometimes the same operations are part of more than one address computation. In this case, an address computing operation can be considered redundant and removable only if all the constant loads that use the address representations, computed in part by that operation, are converted. Such a scenario may result in partial address computation removal.

Figure 2:
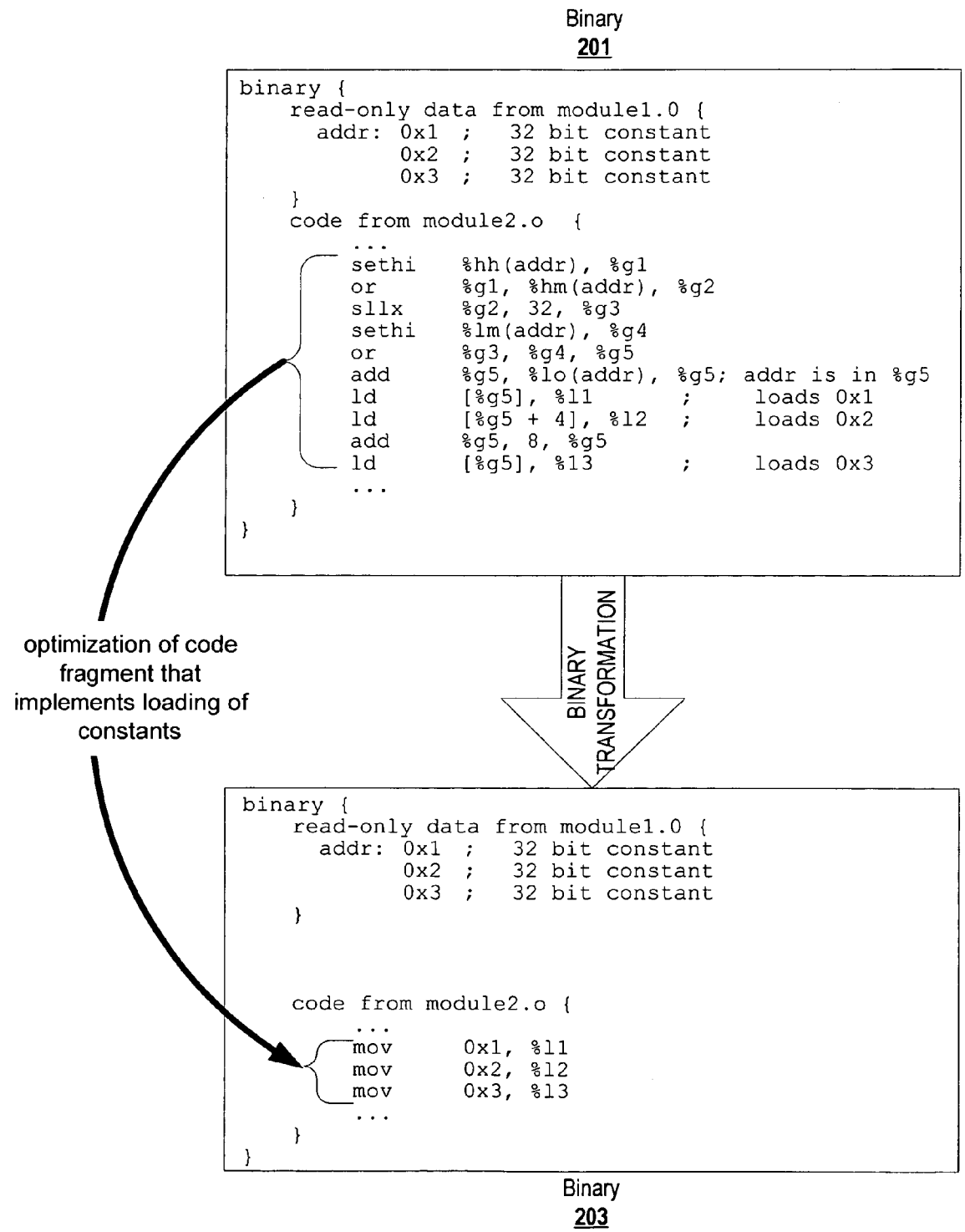
FIG. 2 depicts an example binary that is transformed to optimize code fragments that implement constant loading.

FIG. 2 depicts an example binary that is transformed to optimize code fragments that implement constant loading. An input binary 201 includes constant data (0x1, 0x2, 0x3) originated from module1.o and code originating from module2.o, which includes a code fragment that implements loading of the three 32-bit constants: 0x1, 0x2, and 0x3. A code fragment is not necessarily an entire module, and may encompass more than one module, a portion of a module, portions of multiple modules, a single instruction instance, etc. Each source module can also include multiple optimizable code fragments. The following instruction instances compute an address representation that is the base for all three constant loads.

|      |                           |
|------|---------------------------|
| sethi | %hh(addr), %g1           |
| or   | %g1, %hm(addr), %g2       |
| sllx | %g2, 32, %g3              |
| sethi | %lm(addr), %g4           |
| or   | %g3, %g4, %g5             |
| add  | %g5, %lo(addr), %g5; addr is in %g5 |

The location indicated with addr resides in a read-only area for the binary. After the address representation base is computed and stored in the register %g5, the next instruction instance loads a constant at this address into register %l1.

ld [%g5], %l1; loads 0x1

The next instruction instance computes an address representation and loads a constant at the location indicated by that address representation into the register %l2.

ld [%g5+4], %l2; loads 0x2

The subsequent sequence of instruction instances compute an address representation and store the computed address representation into the register %g5. The constant at the address representation stored in the register %g5 is then loaded into the register %l3.

|     |              |   |           |
|-----|--------------|---|-----------|
| add | %g5, 8, %g5  |   |           |
| ld  | [%g5], %l3   | ; | loads 0x3 |

The transformation of the binary 201 into a binary 203 results in a significant reduction in the size of the code fragment and increased efficiency of the code. In the binary 203, the code fragment in module2.o has been reduced to the following code:

|     |          |
|-----|----------|
| mov | 0x1, %l1 |
| mov | 0x2, %l2 |
| mov | 0x3, %l3 |

Furthermore, the tool could propagate these constants through the code, a process that may allow the tool to remove the above operation instances as redundant.

The mov instruction instances directly set the constants into the registers %l1, %l2, and %l3. With the direct loading of constants, there is no need to compute any of the three address representations. The conversion renders all of the address computing operations redundant, thus allowing elimination of the address computing operations. Binary transformation has also eliminated three instances of ld, thus avoiding slow trips through the memory hierarchy that can potentially be triggered by each of the instances of ld. In addition, if the tool can prove that these three constants are not accessed from other places in the code, the constants can be considered redundant and can be removed from data—they are now embedded into code. The result is a much faster binary with reduced code size and reduced data size.

Just as is the case with a post-link binary, a global scope pre-link object file can also provide global visibility of an application's code and data. The constant loading code fragments may need to be treated differently in the pre-link object file, although still, the object file contains information that can be leveraged to optimize these fragments. Compared to a post-link binary, a pre-link object file usually contains fewer value constants, because many constants at this stage are still constant objects with attached relocations (relocation constants) waiting to be converted to value constants by a linker. Value constants in a pre-link object file can be handled in the same manner as in a post-link binary for transformation. Although relocation constants are not value constants, there is sufficient information in a pre-link object file to be leveraged for transformation to optimize code fragments that implement relocation constant loading.

Figure 3:
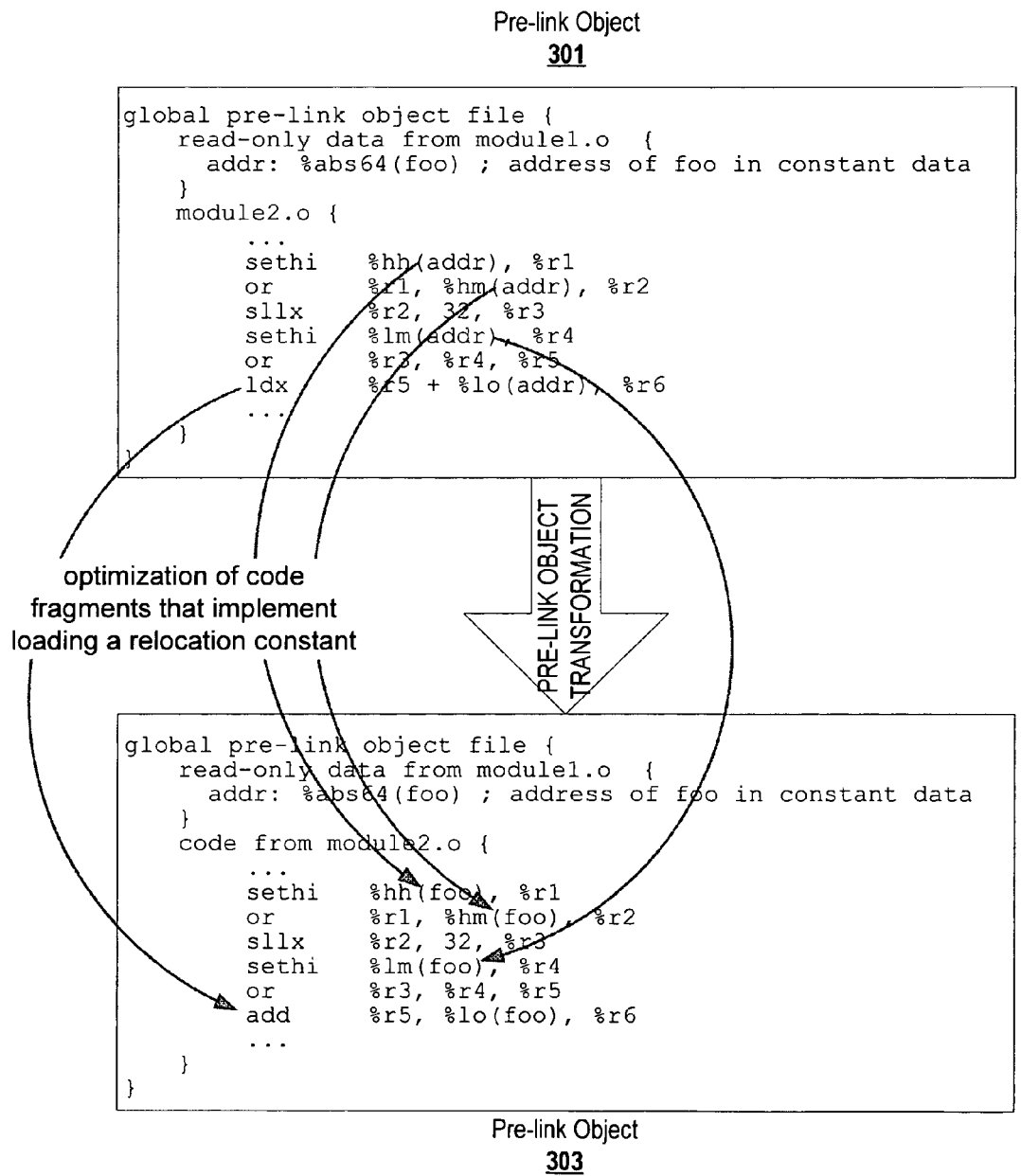
FIG. 3 depicts an example pre-link object file that is transformed to optimize code fragments that implement relocation constant loading.

FIG. 3 depicts an example pre-link object file that is transformed to optimize code fragments that implement relocation constant loading. A pre-link object 301 is a pre-link object file with global scope (i.e., an object file that incorporates all of the application's object files, object archives, libraries, etc.). The pre-link object 301 includes the following instruction instances to compute an address representation for a constant, which in this context is a relocation constant.

|       |                       |
|-------|-----------------------|
| sethi | %hh(addr), %r1        |
| or    | %r1, %hm(addr), %r2   |
| sllx  | %r2, 32, %r3          |
| sethi | %lm(addr), %r4        |
| or    | %r3, %r4, %r5         |
| ldx   | %r5 + %lo(addr), %r6  |

The above sequence of instruction instances results in the address of the relocation constant foo being loaded into the register %r6. The pre-link object 301 is transformed into a pre-link object 303, which directly identifies the relocation constant instead of an address where the relocation constant can be located. In the transformed pre-link object 303, the operations that set the relocation constant foo via addr have been converted to set the relocation constant directly. The transformed module2.o includes the following sequence of instruction instances:

|       |                      |
|-------|----------------------|
| sethi | %hh(foo), %r1        |
| or    | %r1, %hm(foo), %r2   |
| sllx  | %r2, 32, %r3         |
| sethi | %lm(foo), %r4        |
| or    | %r3, %r4, %r5        |
| add   | %r5, %lo(foo), %r6   |

The transformed binary now sets the address of foo in the register %r6. The read type memory access operation ldx has been eliminated, and the address calculation of addr and the load from addr have been replaced with an address calculation of foo. Again, a potential trip through the memory hierarchy has been averted by eliminating a read type memory access operation. Instead, the transformation employs non-memory operations, effectively embedding the constant into the code. Furthermore, if the constant located at address addr is proved not to be accessed from other code fragments, it can be removed.

When a memory access operation is converted, the resulting code ("conversion code"), is generated based, at least in part, on the constant being loaded. Conversion code may be a single instruction instance. For example, if a load instruction instance loads a constant 0, the load instruction instance may be converted into an instruction instance that zeroes a target register of the load instruction instance being eliminated. In general, a constant loading memory access operation can be converted into one or more instruction instances depending on the number of bits that need to be set in the target register and on the capabilities of the instruction set. For example, for a small constant, a ld may be converted into a simple mov operation. For larger constants, two or more instruction instances may be necessary to accommodate a larger constant (e.g., converting a ld into a sethi and add combination). Despite the conversion code sometimes being larger (one ld can be converted to one or more instruction instances) the conversion increases the efficiency of the transformed code through elimination of the interactions with a slow memory hierarchy. In the worst case, a load can trigger cache misses, TLB miss, page fault, disk read, etc. A transformation that optimizes constant loading code fragments may be able to eliminate a lengthy load process with just one, faster operation. Avoiding a complete trip, or even a partial trip, through the memory hierarchy reduces memory access activity, which results in an optimized binary that is faster and more power efficient (e.g., fewer cache references result in less heat generated). In addition, removal of address computing operations relieves some of the pressure on the memory hierarchy. In addition, removal of address computing operations (rendered redundant by the conversion) overshadows a negative effect(s) that extra constant setting instruction instances may cause.

Figure 4A:
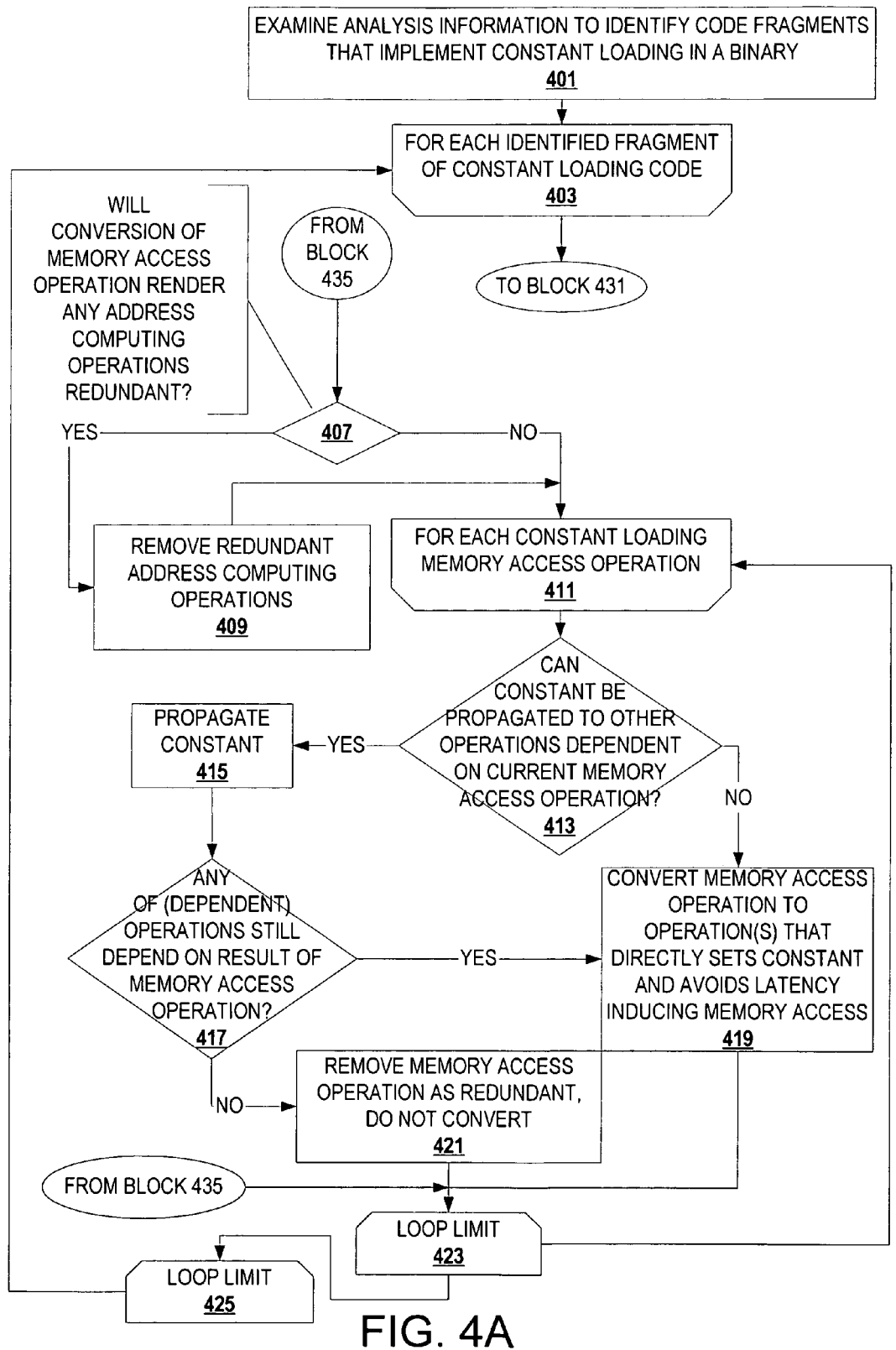
FIGS. 4A-4B depict an example flowchart for optimization of code fragments that implement constant loading.
Figure 4B:
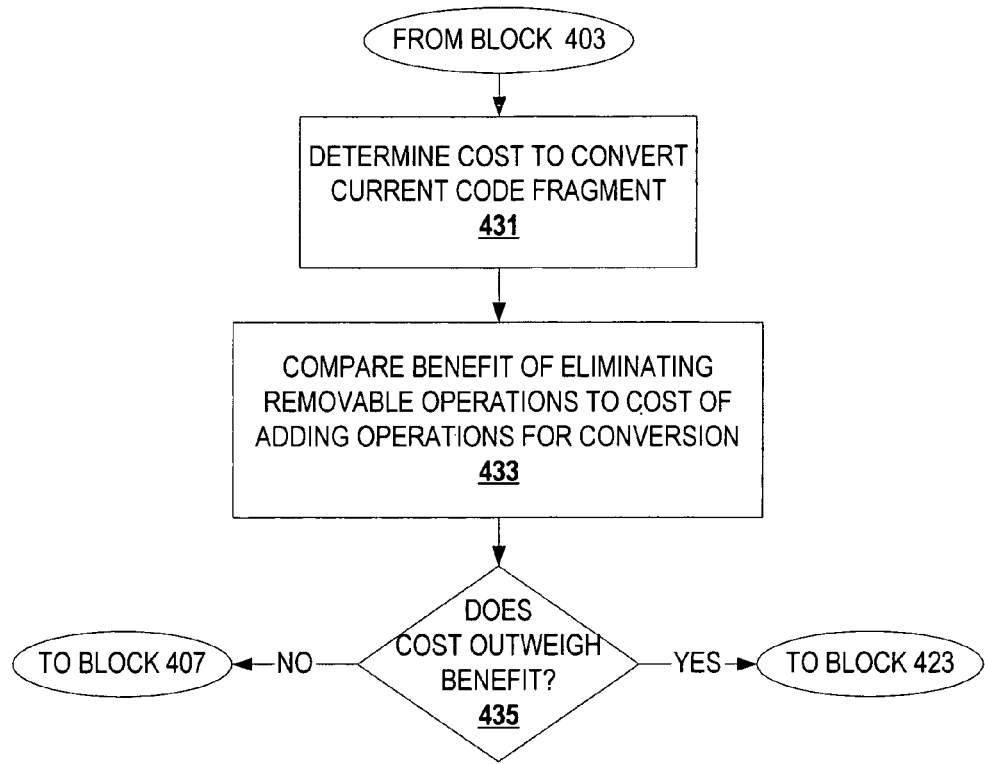

FIGS. 4A-4B depict an example flowchart for optimization of code fragments that implement constant loading. FIG. 4A depicts an example flowchart for optimization of code fragments that implement constant loading. At block 401, analysis information is examined to identify code fragments that implement constant loading in a binary. At block 403, a loop begins for each identified code fragment. Control flows from block 403 to block 431 of FIG. 4B.

FIG. 4B depicts an example portion of the flowchart in FIG. 4A to reflect cost/benefit analysis. At block 431, the cost to convert the current code fragment is determined. Various techniques can be employed to determine the cost to convert the current code fragment. For example, a weight may be associated with one or more types of operations (e.g., load and store type operations may be associated with a higher cost weight than an add type operation). The cost can then be determined, at least in part, with the sum of the weights of the operations in the conversion code. At block 433, the benefit of eliminating the removable operations (i.e., the memory access operations to be converted and those address representation computing operations that will be rendered redundant by the conversion) is compared against the cost of adding operations to perform conversion of the code fragment. At block 435, it is determined whether the cost outweighs the benefit. If the cost of conversion outweighs the benefit of conversion, the fragment is skipped and control flows to block 423 of FIG. 4A. If the cost of conversion does not outweigh the benefit, then control flows to block 407.

Returning to FIG. 4A, at block 407, it is determined if conversion of a memory access operation(s) in the current code fragment will render any of the corresponding address computing operations redundant. If none of the corresponding address computing operations will be rendered redundant, then control flows to block 411. If some of the corresponding address computing operations will be rendered redundant, then control flows to block 409.

At block 409, the redundant address computing operations are eliminated (or indicated for elimination). Control flows from block 409 to block 411.

At block 411, a nested loop begins for each constant loading memory access operation in the current code fragment. At block 413, it is determined if the constant being loaded can be propagated to other operations dependent on the current memory access operation. If the constant can be propagated, then control flows to block 415. If the constant cannot be propagated, then control flows to block 419.

At block 419, the memory access operation is converted to an operation(s) that directly sets the constant and avoids latency inducing memory access. Control flows from block 419 to block 423.

At block 415, the constant is propagated. At block 417, it is determined if any of the operations, previously considered dependent, are still dependent upon the result of the read operation. If dependencies upon the result of the memory access operation remain, then control flows to block 419. If no dependencies remain upon the result of the memory access operation, then control flows to block 421.

At block 421, the memory access operation is removed as redundant, and is not converted. At block 423, the loop limit is encountered. If there are additional memory access operations in the current code fragment, then control flows to block 411. If there are no additional memory access operations in the current code fragment, then control flows to block 425, which is the loop limit that corresponds to block 403. Control flows back to block 403 from block 425 if there are additional code fragments.

After conversion of a memory access operation, the operations that compute the address representation for the memory access operation often become redundant and can be removed, as illustrated in FIGS. 4A-4B. The larger the computations, the more redundant operations may be removed. Conversion of memory access operations may reduce both the static and the dynamic operation counts, which reduces both code size and execution time. For example, large database applications may see thousands of frequently executed memory access operations converted and corresponding address computing operations eliminated.

The conversion of read operations may also be applied recursively. For example, a first read operation loads an address constant. The address constant is subsequently used by a second read operation to load a value constant. Both the first and the second operations can be converted. If a set constant is used by an indirect call as a calling address, this knowledge may be used to eliminate the uncertainty the indirect call represents (i.e., the indirect call may be converted into a direct call). The elimination of redundant code that implements constant loading allows a software tool to perform optimizations previously deemed unsafe, or even impossible (e.g., inlining a previously hidden callee that is exposed by the elimination).

Figure 5A:
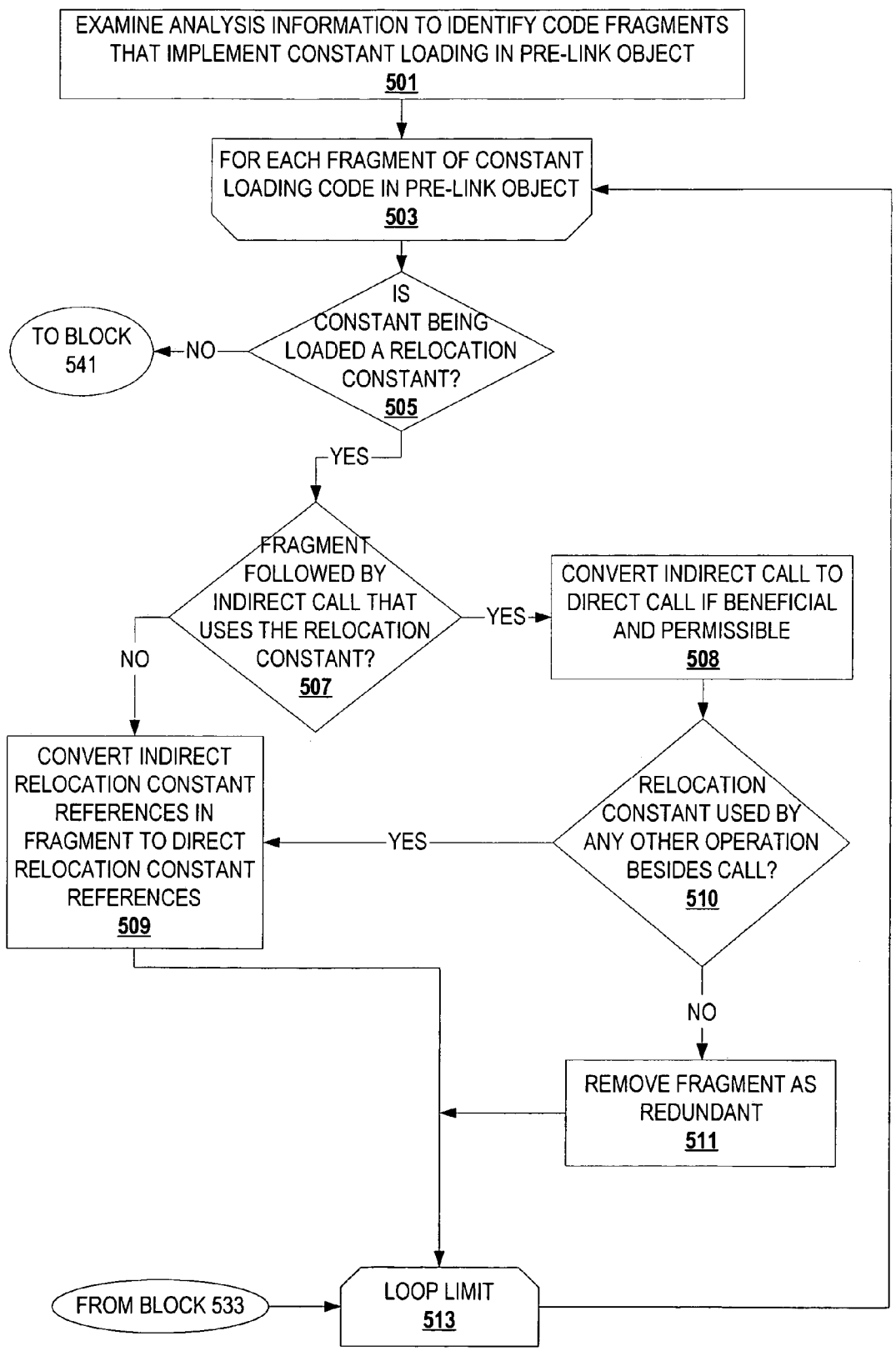
FIGS. 5A-5C depict an example flowchart for pre-link object file optimization of code fragments that implement constant loading and inlining a callee.
Figure 5B:
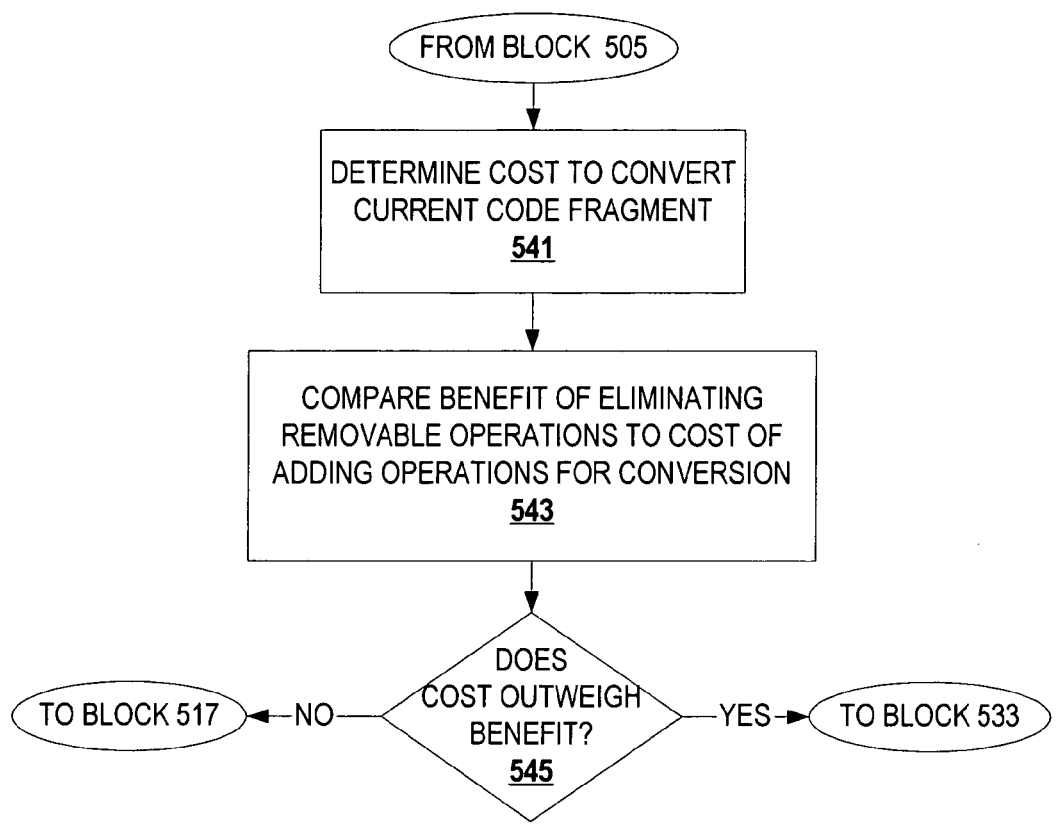
Figure 5C:
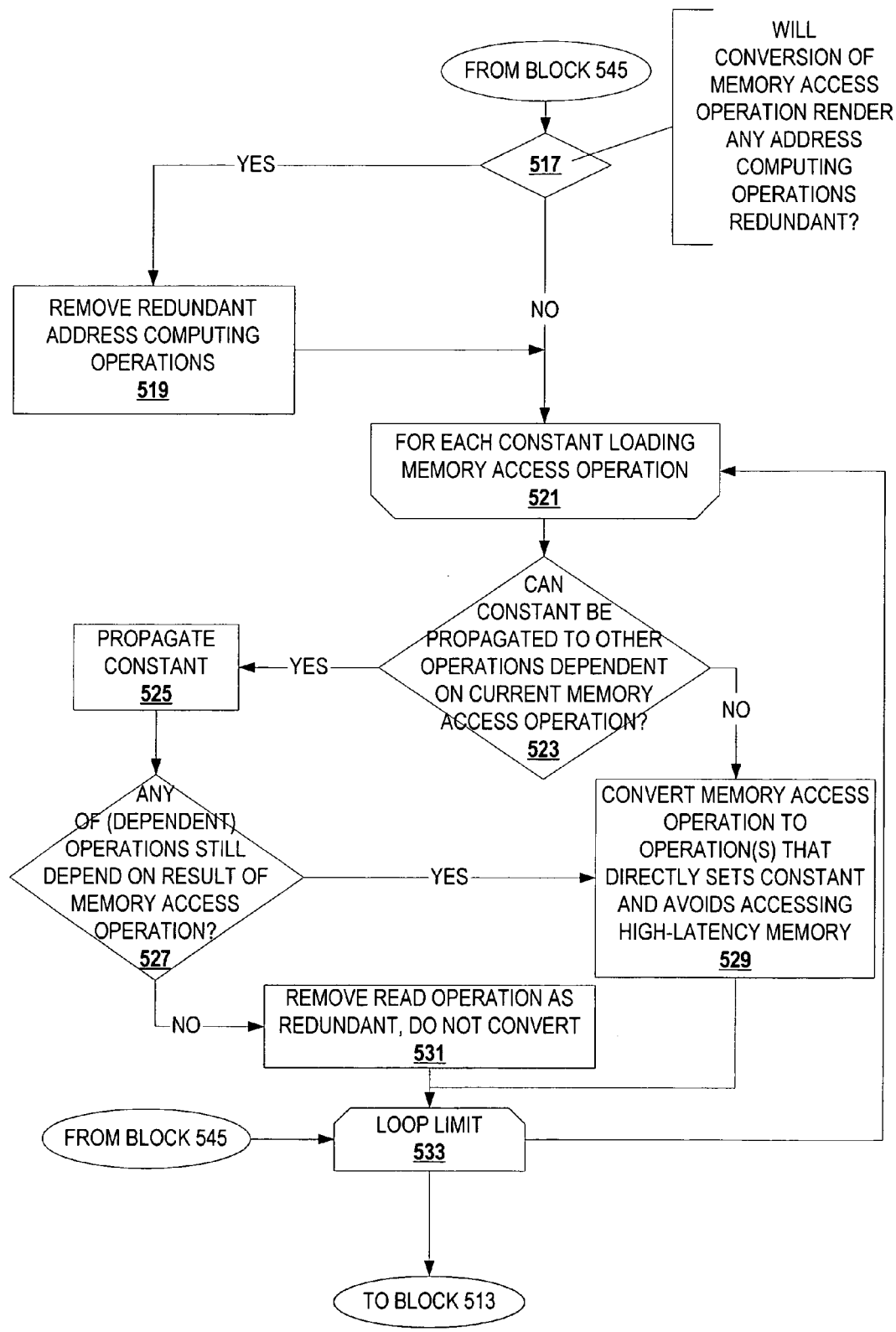

FIGS. 5A-5C depict an example flowchart for pre-link object file optimization of code fragments that implement constant loading and inlining a callee. FIG. 5A depicts an example flowchart for optimizing redundant code that implements loading a relocation constant. At block 501, analysis information is examined to identify the code fragments that implement loading constants in a pre-link object file. At block 503, a loop begins for each identified code fragment. At block 505, it is determined if the constant being loaded is a relocation constant. If the constant being loaded is not a relocation constant, then control flows to block 515. If the constant being loaded is a relocation constant, then control flows to block 507.

At block 507, it is determined if the code fragment is followed by (or includes) an indirect call that uses the relocation constant. If there is an indirect call that uses the relocation constant, then control flows to block 508. If the code fragment is not followed by (or does not include) an indirect call that uses the relocation constant, then control flows to block 509.

At block 509, indirect references to the relocation constant are converted to direct references to the relocation constant. For example, in the pre-link object 303 of FIG. 3 the indirect references addr were converted to direct references to the relocation constant foo. Referring again to FIG. 5A, control flows to block 513 from block 509.

At block 508, the indirect call is converted to a direct call if beneficial and permissible (i.e., as long as conversion does not corrupt or invalidate the code). At block 510, it is determined if the relocation constant is used by any other operation besides the indirect call. The tool ensures that the register used by the indirect call is only set by the identified constant loading code fragment. If no other operation uses the relocation constant besides the call, then control flows to block 511. If any other operation uses the relocation constant besides the call, then control flows to block 509. At block 511, the code fragment is removed as redundant. Hence, if the current code fragment is followed by an indirect call which is converted to a direct call, then the address computing operations and the read operation(s) that load the relocation constant are removed.

Figure 6:
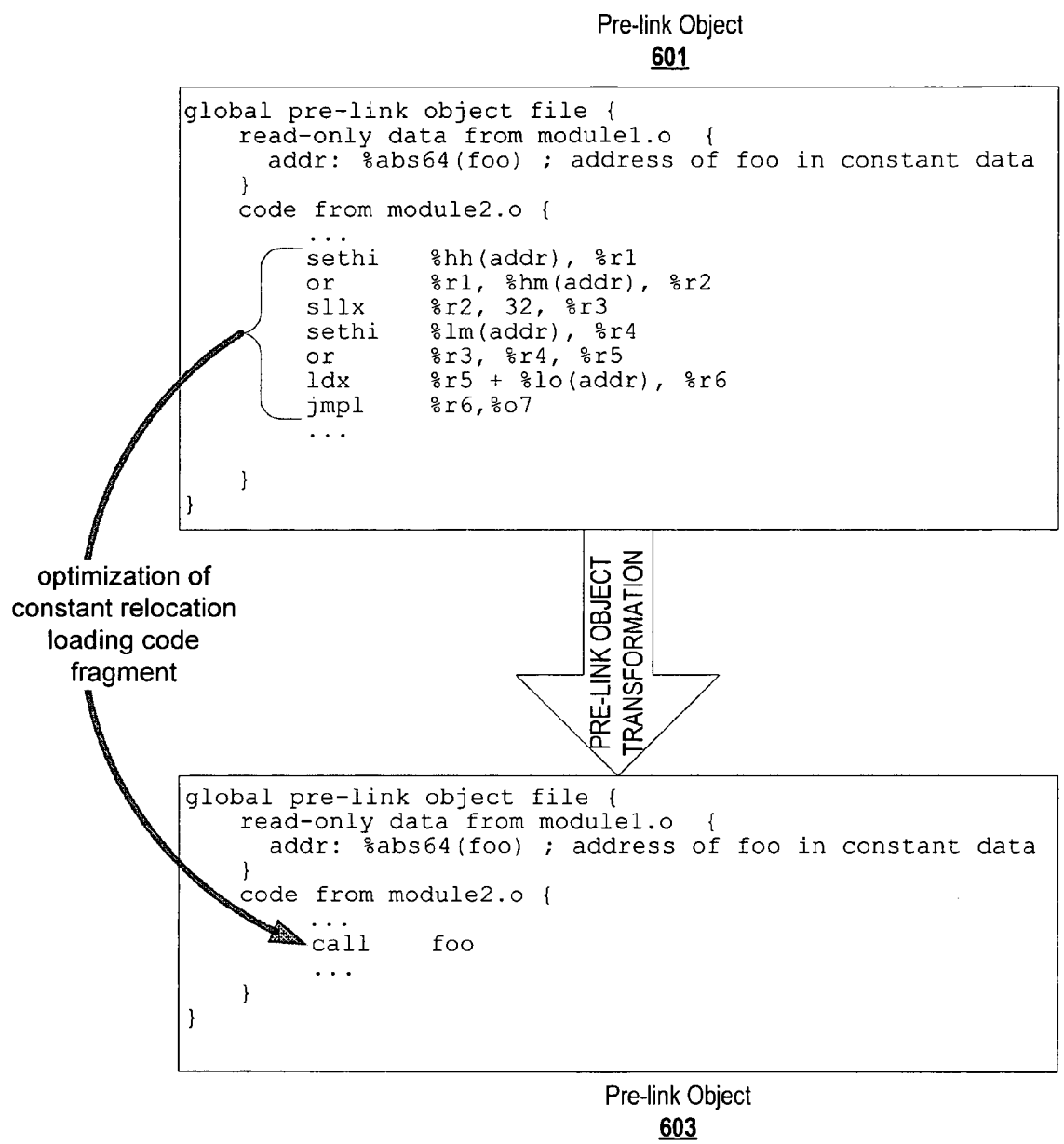
FIG. 6 depicts example optimization of a pre-link object file to convert an indirect call to a direct call.

FIG. 6 depicts example optimization of a pre-link object file to convert an indirect call to a direct call. A pre-link object 601 includes the same sequence of instruction instances as the binary 301 of FIG. 3, with an additional indirect call.

```
module2.o {
    sethi       %hh(addr), %r1
    or          %r1, %hm(addr), %r2
    sllx        %r2, 32, %r3
    sethi       %lm(addr), %r4
    or          %r3, %r4, %r5
    ldx         %r5 + %lo(addr), %r6
    jmpl        %6,%o7
}
```

The additional instruction instance saves the address representation that has been stored in the register %r6 into the destination register %o7 and sets a next program counter to the address representation. Instead of the above sequence of instruction instances, the pre-link object 601 can be transformed into a pre-link object 603, which significantly reduces the module2.o.

module2.o {call foo}

Upon execution of the call instruction instance, control is transferred to a location that will replace the label foo after linking.

Although the example depicted in FIG. 6 illustrates transformation of a global scope pre-link object file, the optimizing transformation may also be applied to a post-link binary. In a corresponding post-link binary, however, the %abs64 relocation is already resolved by a linker. Hence, a tool performs additional analysis to recognize the value at addr as the address of foo. If the tool determines that the value at addr is used only by the indirect call fragment and if the indirect call is converted to a direct call, then the piece of data (address of foo) can be removed as redundant, and the address for foo is embedded into a direct call.

Returning to FIG. 5A, control flows from block 511 to block 513. Block 513 is the loop limit for the loop initiated at block 503. If there are additional code fragments, then control returns to block 503.

FIG. 5B depicts an example portion of the flowchart in FIG. 5A to reflect cost/benefit analysis. At block 541, the cost to convert the current code fragment is determined. At block 543, the benefit of eliminating the removable operations (i.e., the memory access operations to be converted and those address representation computing operations that will be rendered redundant by the conversion) is compared against the cost of adding operations to perform conversion of the code fragment. At block 545, it is determined whether the cost outweighs the benefit. If the cost of conversion outweighs the benefit of conversion, the fragment is skipped and control flows to block 533 of FIG. 5C. If the cost of conversion does not outweigh the benefit, then control flows to block 517 of FIG. 5C.

FIG. 5C depicts a flowchart that continues from FIG. 5B. At block 517, it is determined if conversion of a memory access operation(s) in the current code fragment will render any of the corresponding address computing operations redundant. If none of the corresponding address computing operations will be rendered redundant, then control flows to block 521. If some of the corresponding address computing operations will be rendered redundant, then control flows to block 519.

At block 519, redundant address computing operations are eliminated (or indicated for elimination). Control flows from block 519 to block 521.

At block 521, a nested loop begins for each constant loading memory access operation in the current code fragment. At block 523, it is determined if the constant being loaded can be propagated to other operations dependent on the current memory access operation. If the constant can be propagated, then control flows to block 525. If the constant cannot be propagated, then control flows to block 529.

At block 529, the memory access operation is converted to an operation(s) that directly loads the constant and avoids latency inducing memory access. Control flows from block 529 to block 533.

At block 525, the constant is propagated. At block 527, it is determined if the constant could not be propagated to one or more dependent operations. If the constant could not be propagated to all of the dependent operations, then control flows to block 529. If the constant has been propagated to all of the operations that are dependent on the current read operation, then control flows to block 531.

At block 531, the read operation is removed as redundant, and not converted. At block 533, the loop limit is encountered. If there are additional read operations in the current code fragment, then control flows to block 521. If there are no additional read operations in the current code fragment, then control flows to block 513.

Figure 7A:
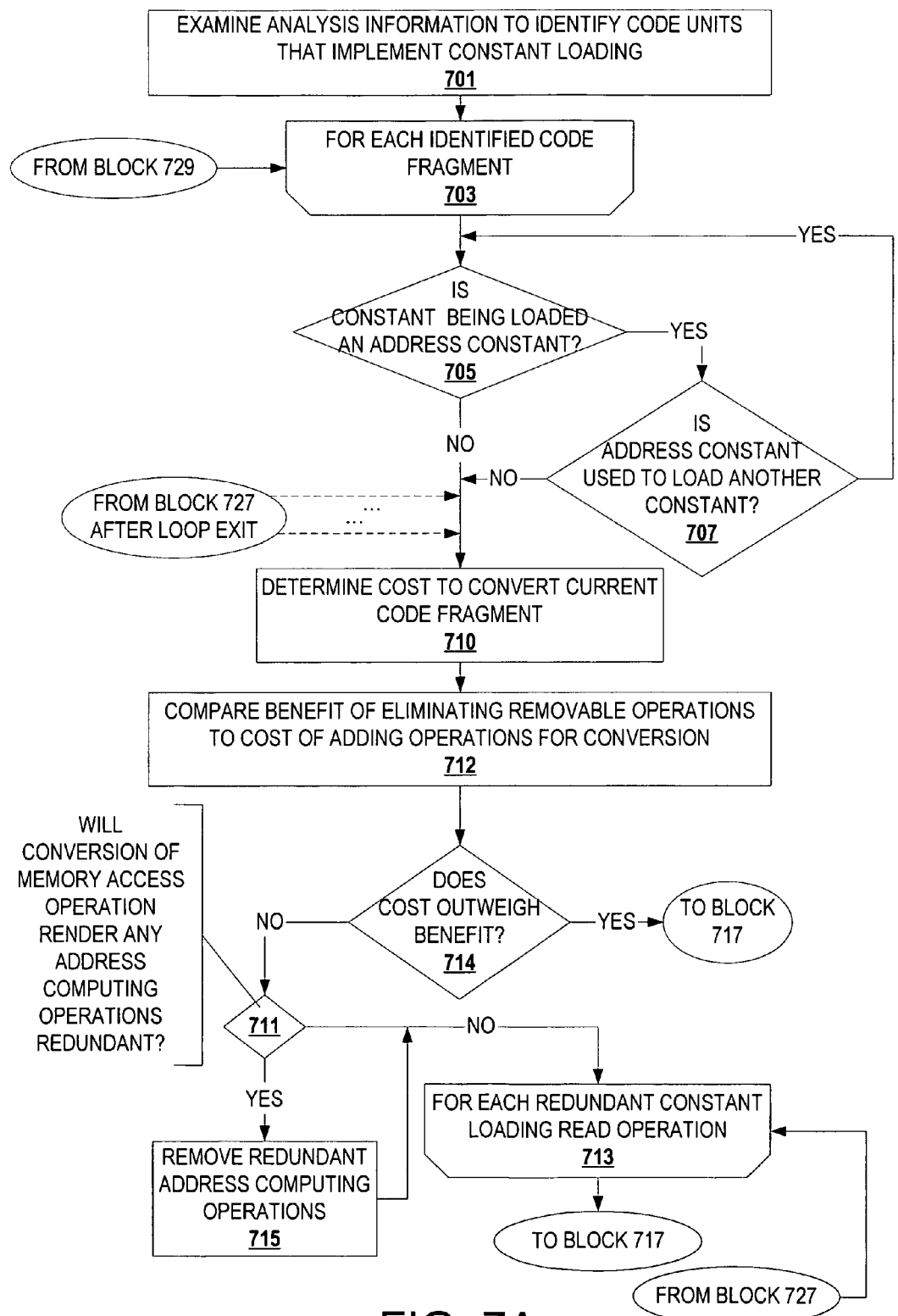
FIGS. 7A-7B depict a flowchart for recursively optimizing code fragments that implement constant loading.
Figure 7B:
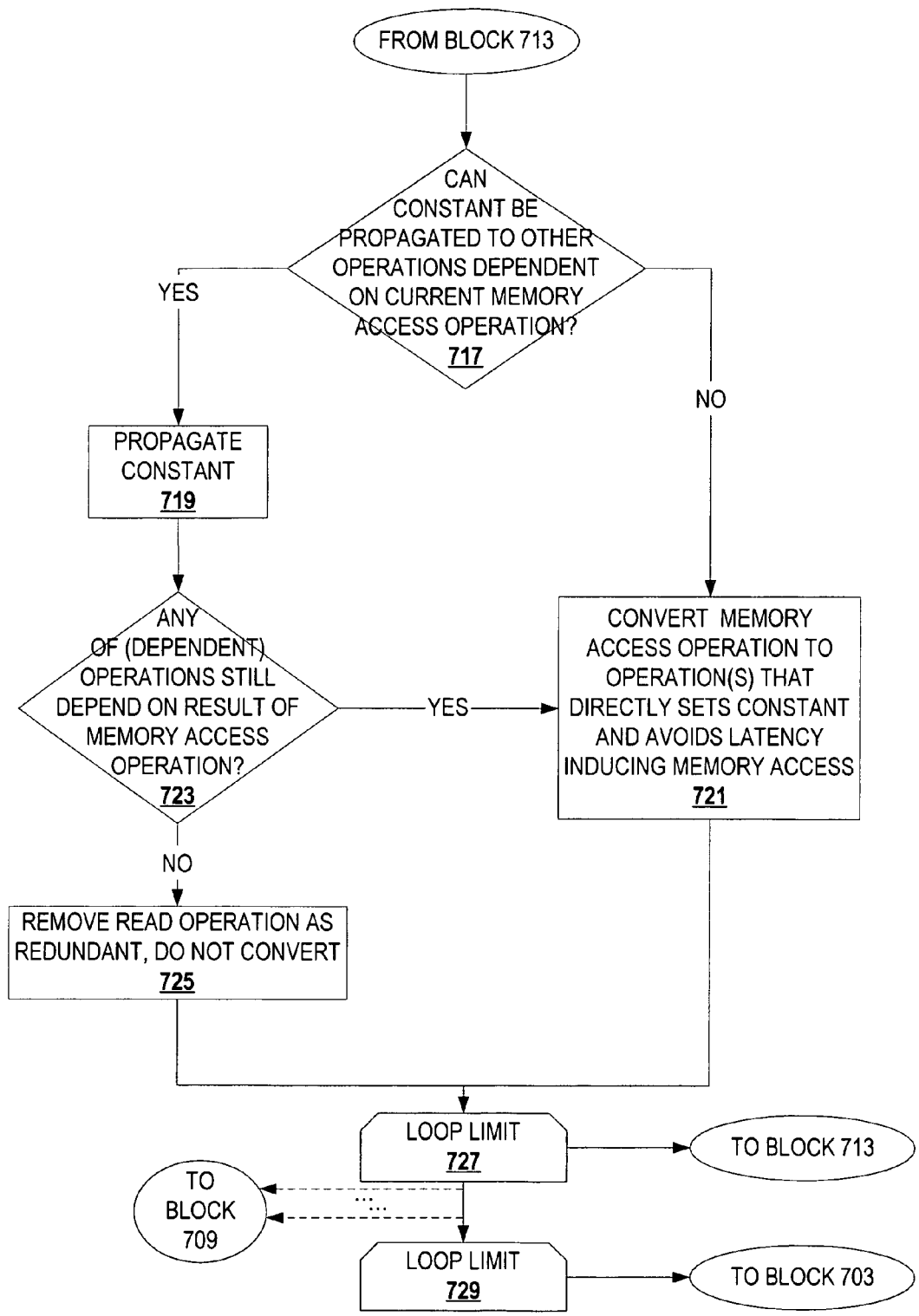

FIGS. 7A-7B depict a flowchart for recursively optimizing code fragment that implements constant loading. FIG. 7A depicts an example flowchart for recursively optimizing code fragments that implement constant loading. At block 701, analysis information is examined to identify code fragments that implement constant loading. At block 703, a loop begins for each identified code fragment. At block 705, it is determined if the constant being loaded is an address constant. If the constant being loaded is an address constant, then control flows to block 707. If the constant being loaded is not an address constant, then control flows to block 710.

At block 707, it is determined if the address constant is used to load another constant. If the address constant is used to load another constant, then control flows back to block 705. If the address constant is not being used to load another constant, then control flows to block 710. The flow from block 707 back to block 705 can be implemented in code as a recursive call to a function or module that implements optimization of code fragments that implement constant loading.

At block 710, the cost to convert the current code fragment is determined. At block 712, the benefit of eliminating the removable operations (i.e., the memory access operations to be converted and those address representation computing operations that will be rendered redundant by the conversion) is compared against the cost of adding operations to perform conversion of the code fragment. At block 714, it is determined whether the cost outweighs the benefit. If the cost of conversion outweighs the benefit of conversion, the fragment is skipped and control flows to block 717 of FIG. 7B. If the cost of conversion does not outweigh the benefit, then control flows to block 711. At block 711, it is determined if conversion of a memory access operation(s) in the current code fragment will render any of the corresponding address computing operations redundant. If none of the corresponding address computing operations will be rendered redundant, then control flows to block 713. If some of the corresponding address computing operations will be rendered redundant, then control flows to block 715.

At block 715, the redundant address computing operations are eliminated. Control flows to block 715 to block 713.

At block 713, a loop is initiated for each constant loading memory access operation in the current code fragment. Control flows from block 713 to block 717.

FIG. 7B depicts an example flowchart that continues from FIG. 7A. At block 717, it is determined if the constant can be propagated to other operations dependent on the current read operation. If the constant can be propagated, then control flows to block 719. If the constant cannot be propagated, then control flows to block 721.

At block 719, the constant is propagated. At block 723, it is determined if any of the operations, previously considered dependent, are still dependent upon the result of the memory access operation. If dependencies upon the result of the memory access operation remain, then control flows to block 721. If no dependencies remain upon the result of the memory access operation, then control flows to block 725. At block 725, the memory access operation is removed as redundant, and not converted. Control flows from block 725 to block 727.

At block 721, the current memory access operation is converted to an operation(s) that directly sets the constant and avoids a latency inducing memory access. Control flows from block 721 top block 727.

Block 727 is a loop limit for the loop initiated at block 713. If the loop continues, then control flows back to block 713. If the current loop has completed, then control flows to block 729, unless recursive execution remains. If recursive execution remains, then control flows recursively to block 709. Block 729 is a loop limit for the loop initiated at block 703. If the loop has not completed, then control flows back to block 703.

Although not depicted in the above flowcharts, the decision to eliminate may be based on additional factors. The decision to eliminate may consider the constant itself and the number of operations needed to set the constant directly. A decision to eliminate may also be based, at least in part, on hotness of a memory accessing read operation that loads a constant, and/or hotness of corresponding address computing operations, as well as whether the address computing operations may be removed after conversion of the read operation. It should also be noted that this optimization is independent of the particular source for a constant. Regardless of whether the constant originated from a source file written in Fortran, C, C++, the Java programming language, assembly, etc., the optimization uses the location of a constant in a read-only area independent of source language.

Injecting constant data into binary analysis also introduces numerous opportunities for further optimization that are not available at compile time. Removing redundant address computing operations frees additional resources, such as registers used by redundant address computing operations. The freed registers can be used to eliminate even more memory references through register reallocation and register spill elimination. Furthermore, certain code may be exposed as dead. For example, conversion of operations may reveal that a conditional statement relies on a constant. Successful evaluation of the condition at the analysis stage may render one of the execution paths for this conditional statement as dead. The conversion renders an execution path from the conditional statement as dead. This code that corresponds to this dead execution path can be removed.

In addition to dead code, dead constants (i.e., constant data objects no longer referenced) can be exposed with optimization of code fragments that implement constant loading. A constant object (i.e., a particular constant) can be removed from constant data (i.e., the aggregate of constant objects in a permission restricted address range(s)) if a tool (e.g., an optimizing tool) proves that all operations that set the constant object have been removed, converted, or that the remaining operations that access the constant are in dead code or are unreachable. As well as reducing footprint of a binary, removing constant objects also allows more effective cache utilization through purging of unused data that would otherwise pollute the cache.

The described embodiments may be provided as a computer program product, or software, that may include a machine-readable medium having stored thereon instructions, which may be used to program a computer system (or other electronic devices) to perform a process according to the present embodiments. A machine readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 8:
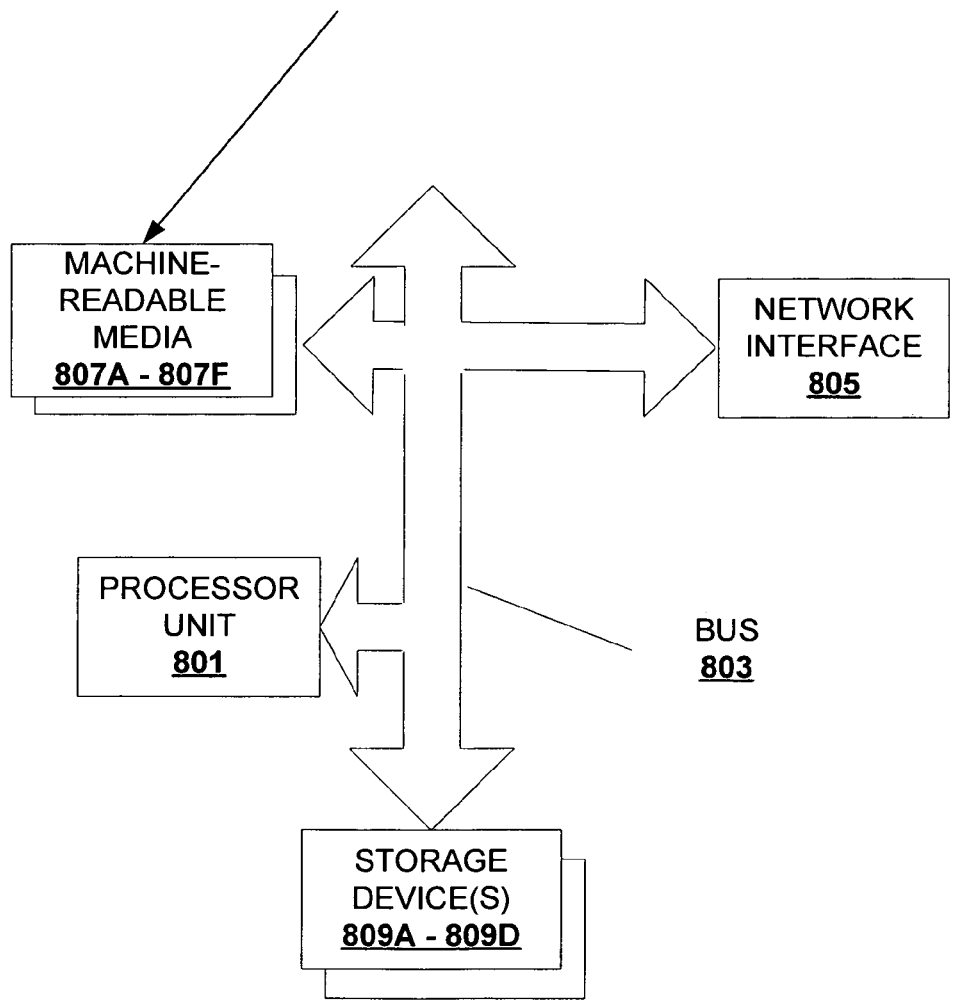
FIG. 8 depicts an example computer system.

FIG. 8 depicts an example computer system. A computer system includes a processor unit 801 (possibly including multiple processors, multiple cores, multiple nodes, and/or implementing multi-threading). The computer system includes machine-readable media 807A-807F. The machine-readable media 807A-807F may be system memory (e.g., one or more of cache, SRAM, DRAM, RDRAM, EDO RAM, DDR RAM, EEPROM, etc.) or any one or more of the above already described possible realizations of machine-readable media. The computer system also includes a bus 803 (e.g., PCI, ISA, PCI-Express, HyperTransport, InfiniBand, NuBus, etc.), a network interface 805 (e.g., an ATM interface, an Ethernet interface, a Frame Relay interface, etc.), and a storage device(s) 809A-809D (e.g., optical storage, magnetic storage, etc.). One or more of the machine-readable media 807A-807F embodies a tool that optimizes redundant code fragments that implement constant loading. In an embodiment, the tool may be partially or completely embodied on a co-processor unit not depicted, in the processor unit 801, a flash memory plugged into the system, etc. Realizations may include fewer or additional components not illustrated in FIG. 8 (e.g., video cards, audio cards, additional network interfaces, peripheral devices, etc.). The processor unit 801, the storage device(s) 809A-809D, and the network interface 805 are coupled to the bus 803. The machine-readable media 807A-807F is either coupled directly or indirectly to the bus 803. In addition, at least some of the functionality for optimizing constant loading code may also be embodied in the storage device(s) 809A-809D and/or the processor unit 801.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method for transforming code comprising:
    identifying, utilizing at least one processing unit, at least one portion of a code that implements constant loading by analyzing information from control flow analysis, data flow analysis, and binary representation and configuration analysis of the code, the code comprising a binary file stored in a machine-readable media, wherein said identifying further comprises analyzing the information from the binary representation and configuration analysis of the code to identify that the at least one portion of the code accesses read-only areas of an address space of the code;
    comparing, utilizing the at least one processing unit, a reduction in reduced execution time from converting at least one of a memory access operation of the at least one portion of the code that loads a constant from memory to one or more operations that directly set the constant or a memory access operation of the at least one portion of the code that loads an address of the constant from the memory to one or more operations that directly set the address of the constant to an increase in execution time from the converting;
    eliminating one or more operations that compute an address representation for at least one of the memory access operation that loads the constant from the memory or the memory access operation that loads the address of the constant from the memory, wherein the comparing is based, at least in part, on at least one of an execution frequency of the memory access operation that loads the constant from the memory, an execution frequency of the memory access operation that loads the address of the constant from the memory, the constant and number of operations to set the constant, capability to propagate the constant, an execution frequency of the one or more operations that compute the address representation, and proportion of the address representation computing operations that can be eliminated; and
    if the reduction exceeds the increase, converting, utilizing the at least one processing unit, the at least one of the memory access operation that loads the constant from the memory to the one or more operations that directly set the constant or the memory access operation that loads the address of the constant from memory to the one or more operations that directly set the address of the constant and directly setting the address of the constant avoids latency incurring access of the memory, wherein converting further comprises converting the memory access operation to one or more register operations and propagating the constant to at least one other portion of the code.

2. The method of claim 1, wherein the one or more register operations comprise at least one of a logical operation, a move operation, a set operation, and an arithmetic operation.

3. the method of claim 1, wherein the code further comprises post-link binary or global scope pre-link object code.

4. The method of claim 1, wherein the converting comprises inlining at least part of the at least a portion of the code.

5. The method of claim 1, further comprising: determining if the constant is dead; and
    when the constant is determined to be dead, eliminating the constant and operations that implement loading the constant, including the memory access operation that loads the constant from the memory.

6. A computer program product encoded in a machine-readable media, the computer program product comprising:
    a first sequence of instructions, stored in at least one machine-readable medium, executable to utilize program analysis information including binary representation of a code to identify one or more code fragments in the code that implement loading of one or more constants, wherein the program analysis comprises control flow and data flow analysis performed to identify one or more memory access operations and one or more address representation computing operations that compute address representations for the memory access operations; and binary representation and configuration analysis performed to determine one or more read-only areas of an address space for the code; and
    a second sequence of instructions, stored in the at least one machine-readable medium, executable to compare a reduction in execution time from converting at least one of a memory access operation of the one or more identified code fragments that loads a constant from memory to one or more operations that directly set the constant or a memory access operation of the one or more identified code fragments that loads an address of the constant from the memory to one or more operations that directly set the address of the constant with an increase in execution time from the converting, wherein the comparison is based on at least one of an execution frequency of the memory access operation that loads the constant from the memory, an execution frequency of the memory access operation that loads the address of the constant from the memory, the constant, number of operations to set the constant, capability to propagate the constant, an execution frequency of the one or more address representation computing operations, and proportion of the address representation computing operations that can be eliminated;
    a third sequence of instructions, stored in the at least one machine-readable medium, executable to convert the at least one of the memory access operation that loads the constant from the memory to the one or more operations that directly set the constant, comprising one or more register operations, or the memory access operation of the one or more identified code fragments that loads the address of the constant from the memory to one or more operations that directly set the address of the constant when the reduction exceeds the increase, the converting avoids latency incurring accesses of the memory.

7. The computer program product of claim 6, wherein the code comprises a binary file.

8. The computer program product of claim 7, further comprising: a fourth sequence of instructions, stored in the at least one-machine readable medium, executable to eliminate one or more address representation computing operations from the code that compute an address representation consumed by the memory access operation that loads the constant from the memory if one or more address representation computing operations are rendered redundant by conversion of the memory access operation that loads the constant from the memory.

9. The computer program product of claim 6, further comprising:
   a fourth sequence of instructions, stored in the at least one machine-readable medium, executable to determine if a constant is a dead constant and
   a fifth sequence of instructions, stored in the at least one machine-readable medium, executable to eliminate at least a portion of an identified code fragment that implements loading of the dead constant.

10. An apparatus comprising:
    a processing unit operable to process a code;
    a memory coupled with the processing unit, the memory operable to host at least one of a constant or an address of a constant; and
    a first set of instructions executable by the at least one processing unit to identify at least one portion of a code that implements constant loading by analyzing information from control flow analysis, data flow analysis, and binary representation and configuration analysis of the code to identify one or more memory access operations and one or more address representation computing operations that compute address representations for the memory access operations; and binary representation and configuration analysis performed to determine one or more read-only areas of an address space for the code;
    a second set of instructions executable by the at least one processing unit to compare a reduction in execution time from converting at least one of a memory access operation of the at least one portion that loads a constant from memory to one or more operations that directly set the constant or a memory access operation of the at least one portion that loads an address of the constant from the memory to one or more operations that directly set the address of the constant to an increase in execution time from the converting, wherein the comparison is based on at least one of an execution frequency of the memory access operation that loads the constant from the memory, an execution frequency of the memory access operation that loads the address of the constant from the memory, the constant, number of operations to set the constant, capability to propagate the constant, an execution frequency of the one or more address representation computing operations, and proportion of the address representation computing operations that can be eliminated;
    a third set of instructions executable by the at least one processing unit to convert the at least one of the memory access operation that loads the constant from the memory or the memory access operation that loads the address of the constant from the memory if the reduction exceeds the increase wherein converting avoids latency incurred from accessing the memory, wherein converting the memory access operation that loads the constant comprises converting the memory access operation to one or more register operations.

11. The apparatus of claim 10, further comprising:
    a fourth set of instructions executable by the at least one processing unit to eliminate one or more operations that compute an address representation for the memory access operation that loads the constant from memory if the one or more address representation computation instructions are rendered redundant by conversion on the memory access operation that loads the constant from the memory.

* * * * *